Aug. 1, 1933.  C. W. STONE  1,920,814
ELECTRIC DISTRIBUTION SYSTEM
Filed Feb. 17, 1931
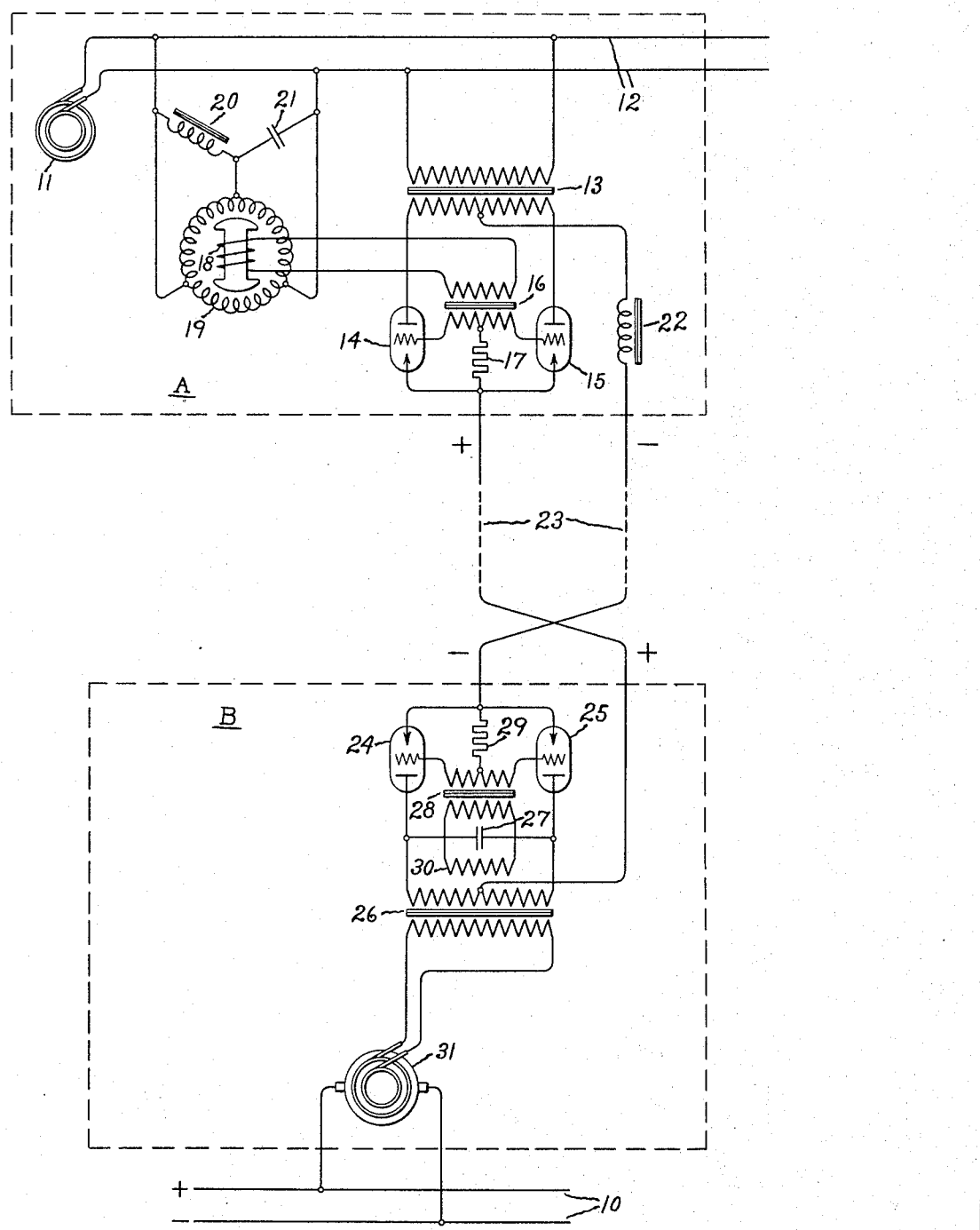
Inventor:
Charles W. Stone,
by Charles E. Tullar
His Attorney.

Patented Aug. 1, 1933

1,920,814

UNITED STATES PATENT OFFICE 1,920,814

ELECTRIC DISTRIBUTION SYSTEM

Charles W. Stone, Schenectady, N. Y., assignor to General Electric Company, a Corporation of New York Application February 17, 1931. Serial No. 516,391

6 Claims. (Cl. 171—97)

My invention relates to systems of electrical distribution and more particularly to such systems in which a direct current network or load circuit is energized from an alternating current circuit through a synchronous converter.

It has become general practice, particularly in metropolitan areas, to energize direct current industrial load circuits or networks from synchronous converters located in substations distributed economically with respect to the load centers. These synchronous converters are usually energized through a step-down transformer either directly from a relatively high voltage alternating current distribution system or through a high voltage alternating current feeder circuit extending directly from a generating station. It is a matter of common knowledge that synchronous converters inherently have comparatively low hold-in torque, and that, consequently, they are very sensitive to fluctuations in the voltage or frequency of the alternating current system from which they are supplied. Abnormal fluctuations in these characteristics of the alternating current system may cause the synchronous converters to hunt or drop out of step. It is also recognized that, in case of a failure of the feeder circuit or the alternating current distribution system from which the synchronous converters are energized, the entire direct current network supplied from the other synchronous converters of the system, will pump energy into the fault, the particular synchronous converters in the defective circuit operating as inverters and transmitting power from the direct current network into the alternating current fault.

Due to the fact that the direct voltage of a synchronous converter bears substantially a constant and predetermined relation to the voltage of the alternating current circuit from which it is supplied, it has heretofore been advisable or necessary to supply some means of regulating the voltage of the alternating current supplied to the converter, such for example, as tap changing transformers, induction regulators, series boosters, etc. These devices are expensive, occupy space, and have operating disadvantages so that the range of voltage variation has been limited to the minimum amount.

It is an object of my invention to provide an improved electrical distribution system including a synchronous converter which will be simple and economical in operation and which will overcome the above mentioned disadvantages ordinarily attendant upon the use of synchronous converters.

It is a further object of my invention to provide an improved electrical distribution system including a synchronous converter in which the stability of the converter will be independent of fluctuations in the voltage or frequency of the alternating current system from which it is supplied.

It is a further object of my invention to provide an improved electrical distribution system including a synchronous converter in which, in case of a fault in the circuit from which it derives its power, it will be impossible for the direct current circuit to which it is connected to force energy through the converter in a reverse direction, operating as an inverter and feeding energy from the network into the faulty feeder circuit.

It is still a further object of my invention to provide an improved electrical distribution system including a synchronous converter in which the voltage of the direct current circuit which is energized therefrom may be gradually and smoothly varied from substantially zero to its maximum value.

In accordance with my invention, the output of an alternating current circuit from which a synchronous converter is to be energized is first transformed to a high voltage and rectified, preferably at the generating station. This high voltage rectified current is transmitted through a feeder circuit to a sub-station including the synchronous converter and is there inverted into alternating current by means of an electric valve inverter, examples of which are well known in the art. The synchronous converter is energized from the output of this inverter circuit and means is provided to determine the frequency of the inverter-converter combination independently of the frequency of the alternating current circuit from which it derives energy. I have also provided means for controlling the average voltage of the rectified current delivered by the rectifier at the generating station in order that the load of the direct current network or load circuit may be gradually picked up in case of any interruptions in service.

For a better understanding of my invention, together with other and further objects thereof, reference is had to the following description taken in connection with the accompanying drawing and its scope will be pointed out in the appended claims. The single figure of the accompanying drawing illustrates my invention as applied to a single feeder circuit adapted to energize a direct current load circuit or network through a synchronous converter from alternating current energy derived from the generating station.

Referring now to the drawing, I have illustrated an arrangement for receiving energy from the alternating current generating station A and transmitting it to a substation B which is connected with a direct current distribution network 10. The generating station A includes an alternating current generator 11 and its associated bus 12 and a rectifier comprising a transformer 13 energized from the bus 12 and a pair of electric valves 14 and 15 connected in a well known manner to provide full wave rectification. Electric valves 14 and 15 are each provided with an anode, a cathode, and a control grid and may be of any of the several types well known in the art, but I prefer to use valves of the vapor electric discharge type. The grids of the valves 14 and 15 are connected to their common cathode connection through opposite halves of the secondary winding of a grid transformer 16 and a current limiting resistor 17. The primary winding of the grid transformer 16 is energized from the secondary winding 18 of a rotary phase shifting transformer 19, examples of which are well known in the art. The phase shifting device 19 may be energized from any suitable source of three phase potential of the same frequency as that of the bus 12 or may be energized directly from the bus 12 through a phase splitting arrangement comprising a reactor 20 and a capacitor 21.

The direct current circuit of the above described rectifier is connected through a smoothing reactor 22 to the direct current feeder circuit 23 which extends to the substation B and is connected to an inverter circuit which may be of any of the several types well known in the art. In the figure I have represented an inverter of the parallel type comprising electric valves 24 and 25, a transformer 26 and a commutating capacitor 27. The valves 24 and 25 are each provided with an anode, a cathode and a control grid and may be of any of the several types well known in the art although I prefer to use vapor electric discharge valves. The grids of the valves 24 and 25 are connected to the common cathode circuit through opposite halves of the secondary winding of a grid transformer 28 and through a current limiting resistor 29. The primary winding of grid transformer 28 may be energized from any portion of the alternating current circuit of the inverter and, as shown, is energized from a tertiary winding 30 of the power transformer 26. The secondary winding of the power transformer 26 is connected to the alternating current terminals of a synchronous converter 31 the direct current terminals of which are connected to the direct current network 10. Although I have shown the above described rectifier as located in the generating station A, in certain cases it may be desirable to locate the rectifier in the substation B along with the inverter and, while I have shown a single generating station, feeder circuit and substation, it will be obvious to those skilled in the art that any or all of these various components may be duplicated as desired without departing from my invention. It will ordinarily be found preferable to interconnect such duplicate circuits through the direct current distribution network 10. It will be obvious, also, that the described arrangement is equally applicable to systems for transmitting energy from a polyphase alternating current supply circuit to a direct current load circuit.

In explaining the operation of the above described apparatus, it will be assumed that initially the rotary phase shifting transformer 19 is so adjusted that the potentials applied to the grids of the valves 14 and 15 are in phase with their respective anode potentials so that these valves, in conjunction with the transformer 13, are operating as an ordinary full wave rectifier. Under these conditions, as will be well understood by those skilled in the art, direct current is delivered through the feeder circuit 23 to the inverter comprising the valves 24 and 25, the transformer 26 and the capacitor 27. For a detailed explanation of the operation of this apparatus reference is had to United States Letters Patent No. 1,800,002, granted April 7, 1931, upon the application of Ernst F. W. Alexanderson. In brief, assuming that the valve 24 is initially made conducting, current will flow from the positive direct current line through the valve 24, the left hand portion of the primary winding of transformer 26 to the negative direct current line. As the direct current is building up in this portion of the secondary winding of the transformer 26 a still more negative potential will be induced at the right hand terminal of this winding, the potential being approximately twice that of the direct current line. When the valve 25 is made conducting, the capacitor 27, which has become fully charged to approximately twice the potential of the direct current line, is short-circuited through the valves 24 and 25 in series and tends to send a current in a reverse direction through the valve 24, thus completely interrupting the current in this valve. Before the capacitor 27 becomes completely discharged, the grid of the valve 24 has again become negative to maintain this valve non-conducting during the next half-cycle. In this manner the current is successively transferred between the valves 24 and 25 and an alternating current is delivered to the transformer 26. The capacitor 27 serves not only to commutate the current between the two electric valves but also to determine the natural frequency of oscillation of the circuit, that is, the frequency of the current delivered to the transformer 26, for any predetermined load condition. The alternating current terminals of the synchronous converter 31 are connected to this transformer 26 and are thus energized with alternating current of a frequency which is independent of the frequency of the alternating current circuit 12. Thus, with fluctuations in the voltage or the frequency of the alternating current circuit 12 the frequency of the inverter-converter combination may vary slightly but its stability will not be affected. In case of a fault on the feeder circuit 23, it will be seen that the current cannot be supplied from the direct current network 10 through the converter 31 operating as an inverter because of the unilateral conductivity characteristics of the inverter including the valves 24 and 25. This operating characteristic becomes very important in cases where a direct current network is supplied through a large number of feeder circuits and their associated apparatus.

In case the service becomes interrupted and the voltage of the direct current network 10 is substantially lowered for any cause, the load connected to the circuit 10 may be gradually picked up by initially adjusting the rotary phase shifting transformer 19 so that the grid potentials of the valves 14 and 15 lag their respective anode potentials to reduce the voltage of the feeder circuit 23 to a low value corresponding to the existing voltage on the network 10. By gradually advancing the phase of the grid potentials of the valves 14 and 15 these valves will become conducting at successively earlier points in their respective half-cycles of positive anode potential and the average voltage of the direct current output of the rectifier will be correspondingly increased. Since the voltage of the direct current side of the synchronous converter 31 is directly related to that of the rectifier through the inverter in substation B, the voltage of the direct current network will be correspondingly gradually increased to a maximum.

While the above described system is particularly suitable for starting up a synchronous converter under load, it will be understood that it is of general application in the starting of synchronous dynamo-electric machines under load.

While I have described what I at present consider the preferred embodiment of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. The method of picking up a direct current load supplied from an alternating current circuit through a synchronous converter which comprises rectifying the alternating current, controlling the voltage of the rectified current, inverting the rectified current and energizing the synchronous converter therefrom.

2. The method of starting a synchronous dynamo electric machine energized from an alternating current circuit which comprises rectifying the alternating current, reducing the voltage of the rectified current, converting the rectified current into an alternating current of a frequency independent of that of said source for energizing the synchronous machine, and raising the voltage of the rectified current to increase the speed of the machine.

3. A system of electrical distribution comprising synchronous generating equipment, a synchronous consumption machine remote from said generating equipment, and means for non-synchronously energizing said consumption machine from said generating equipment comprising means for rectifying the output of said generating equipment, a direct current feeder circuit for transmitting said rectified energy to said consumption machine, and means for inverting said rectified current to alternating current of a frequency dependent upon an electrical condition of said system for energizing said consumption machine.

4. A system of electrical distribution comprising synchronous generating equipment subject to frequency variations, a synchronous consumption machine of relatively low hold in torque, and means for energizing said consumption machine from said generating equipment and eliminating the effect of said frequency variations on the stability of said consumption machine comprising means for rectifying the output of said generating equipment, and means for inverting said rectified current to variable frequency alternating current to energize said consumption machine.

5. A system of electrical distribution comprising synchronous generating equipment, a direct current load circuit, a synchronous converter for energizing said load circuit, and means for energizing said synchronous converter non-synchonously with respect to said generating equipment to supply said load circuit with direct current of variable voltage, comprising means for rectifying the output of said generating equipment, means for controlling the output of said rectifying means, means for transmitting said rectified current to said converter, and means for inverting said rectified current to alternating current to energize said synchronous converter.

6. A system of electrical distribution comprising synchronous generating equipment, a direct current load circuit remote from said generating equipment, a synchronous converter for energizing said load circuit, and means for energizing said synchronous converter non-synchronously with respect to said generating equipment to supply said load circuit with direct current of variable voltage comprising means for rectifying the output of said generating equipment including a pair of electric valves each provided with an anode, a cathode, and a control grid, means for exciting said control grids with alternating potentials variable in phase with respect to their anode potentials, a direct current feeder circuit to said remote load circuit, and an electric valve inverter for inverting said rectified current into alternating current of a frequency dependent upon an electrical condition of said system for energizing said synchronous converter.

CHARLES W. STONE.